Patented Aug. 19, 1952

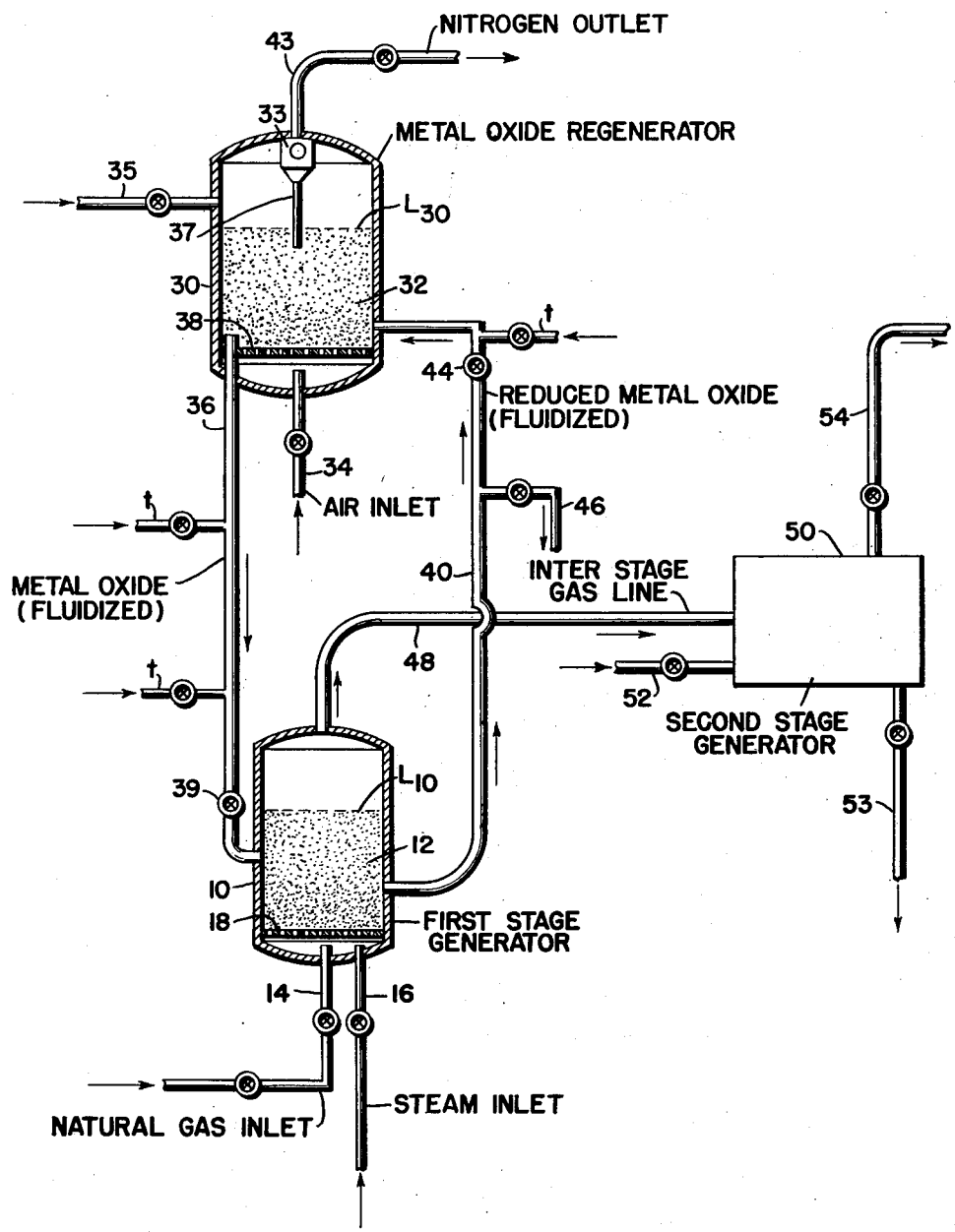

2,607,670

UNITED STATES PATENT OFFICE 2,607,670

PRODUCTION OF GAS MIXTURES CONTAINING CARBON MONOXIDE AND HYDROGEN

Warren K. Lewis, Jr., West Orange, N. J., assignor to Standard Oil Development Company, a corporation of Delaware Application August 15, 1947, Serial No. 768,892

3 Claims. (Cl. 48—196)

The present invention relates to the oxidation of gaseous hydrocarbons such as natural gas, refinery gas, methane, ethane or the like. More particularly, the invention is concerned with the oxidation of such gaseous hydrocarbons by means of metallic oxides to form mixtures of hydrogen and carbon monoxide suitable for the catalytic synthesis of normally liquid hydrocarbons and oxygenated compounds.

The use of metallic oxides as the source of oxygen in the oxidation of gaseous hydrocarbons and the reoxidation of the reduced metal oxide with air have been proposed before. Experience has shown that when the reaction is conducted by passing the hydrocarbons through a fixed bed of the heated metal oxide, the extent of the reaction is difficult to control as a result of the excess oxygen which is available for reacting with the incoming feed and the poor distribution and transfer of heat throughout the solids bed. This difficulty can be avoided by the use of certain metal oxides, such as zinc oxide, which have relatively low oxygen vapor pressures. However, the use of these oxides generally involves other serious disadvantages such as low sublimation or melting temperatures of the metal oxides involved.

Attempts have been made to overcome these difficulties by employing the so-called fluid solids technique wherein the reacting gases are contacted with a relatively dense turbulent suspension of finely divided metal oxide, such as an oxide of copper, iron, manganese, titanium, etc., fluidized by the upwardly flowing gaseous reactants and reaction products to resemble a boiling liquid. Several modifications of this technique have been practiced with varying success while avoiding most of the above mentioned difficulties as a result of the excellent heat distribution and gas-solids contact of these fluidized masses.

Thus, it may be said that the fluid solids technique applied to the oxidation of hydrocarbon gases with metal oxides offers the most promising solution of the problems presented by this process. However, new difficulties arise in connection with this technique.

The oxidation of methane with metal oxides requires temperatures in excess of 1600° F. if commercially satisfactory conversion to CO and $H_2$ is desired. The heat necessary to maintain the normally endothermic reaction at such high temperatures is supplied in the form of sensible heat of metal oxide which has been regenerated by oxidation with air in a separate fluid oxidation zone. This oxidation zone must, therefore, be operated at still higher temperatures. At temperatures in this range, the metal oxides useful for the oxidation process begin to sinter. Due to sintering, the finely divided metal oxide particles stick to the reactor walls and agglomerate to form aggregates of non-fluidizable size which cause fluidization difficulties and tend to thwart the advantages of the fluid solids technique. In practice it is, therefore, necessary to operate at oxidation temperatures below the sintering range of the metal oxides involved, thus frequently preventing the maintenance of optimum conversion and of yields approaching theoretical values.

The present invention overcomes the aforementioned difficulties and affords various additional advantages. These advantages, the nature of the invention and the manner in which it is performed will be fully understood from the following description thereof read with reference to the accompanying drawing.

It is the principal object of the present invention to provide improved means for oxidizing hydrocarbon gases with metal oxides to form gas mixtures containing carbon monoxide and hydrogen.

A more specific object of the present invention is to provide an improved process of the type specified which employs the fluid solids technique.

Other objects and advantages of the invention will appear hereinafter.

In accordance with the present invention, hydrocarbon gases such as natural gas, methane, etc. are first contacted with a dense, turbulent, fluidized mass of finely divided metal oxide capable of oxidizing hydrocarbons to carbon monoxide and hydrogen, at a temperature below the sintering temperature of the metal oxide but high enough to cause conversion of a major proportion of the hydrocarbons charged. Thereafter, the product gas containing unconverted hydrocarbon from the first incomplete conversion stage is contacted in a second conversion stage with oxygen, preferably substantially pure, at a temperature high enough to complete the oxidation of the hydrocarbons to CO and $H_2$ and substantially to prevent oxidation to $CO_2$.

In this manner, the advantages of the fluid solids technique may be preserved and substantially complete conversion of the hydrocarbon gas to CO and $H_2$ obtained. It will also be appreciated that the two-stage operation of the invention combines the advantages of oxidation with fluidized solid metal oxides and those of oxidation with free oxygen while eliminating their drawbacks because it avoids the sintering and fluidization troubles associated with the high temperatures required for complete conversion and yet does not involve the high expense of a large oxygen producing plant, the amount of oxygen required for the final cleanup of hydrocarbons in the second stage being relatively small. Furthermore, such metal oxide fines as escape from the first into the second stage will sinter and agglomerate at the high temperature of the latter, thus facilitating their separation from the product gas.

The temperatures suitable for the first stage of the invention depend mainly on the reactivity and selectivity for CO formation, of the metal oxide used in the first stage. Quite generally, it may be stated that satisfactory results may be secured with the more reactive and selective metal oxides at first stage temperatures of about 1400°–1600° F. to obtain about 65–90% conversion of hydrocarbon gases to CO and $H_2$.

The second stage may be successfully operated at temperatures of about 2000°–2500° F., preferably about 2100°–2300° F. to accomplish substantially complete conversion of the remaining about 10–35% of the hydrocarbon charge. About 8–12% by volume of oxygen of 95% purity, based on the original hydrocarbon charge is usually sufficient for the clean-up stage of the process. At these conditions the equilibria of the reactions $$CH_4 + CO_2 \rightleftharpoons 2H_2 + 2CO$$
$$CH_4 + H_2O \rightleftharpoons 3H_2 + CO$$

will shift strongly to the right and only small amounts of CO and $H_2$ will be lost by oxidation to $CO_2$ and $H_2O$. The oxygen consumption in the second stage is minimized by the fact that the partially converted gas is supplied at the high temperatures of the first stage, which are considerably higher than could be efficiently obtained by the use of conventional heat exchange.

The metal oxides which may be used in the present process are quite generally such oxides as are capable of oxidizing gaseous hydrocarbons to CO and $H_2$ at the conditions of the first process stage. Since the process involves reoxidation of reduced metal oxide with air, the oxides should have such an affinity for oxygen at the temperatures of the first stage that their oxygen partial pressures at equilibrium with both higher and lower stages of oxidation present are less than about 0.10 atmosphere and, preferably, less than 0.01 atmosphere so that substantially all the oxygen of the air used for regeneration can be bound by the lower stage of oxidation.

While certain metal oxides which are reduced to metals such as ferrous oxide, cuprous oxide, and the like, are useful for the process, other suitable oxides are the higher oxides of metals which are capable of forming both higher and lower oxides. Typical for the latter oxides are ferric oxide, cupric oxide, vanadium pentoxide, stannic oxide, titanium dioxide, various manganese oxides and mixtures of these oxides. The oxides of titanium, preferably those promoted with a composite containing a major proportion of iron oxide and minor proportions of nickel oxide and chromium oxide are of particular advantage for the present invention because they have been found to possess satisfactory activity and selectivity to form CO and $H_2$ at the relatively low conversion temperatures maintained in the first stage of the process. The metal oxides may be supported on carriers such as kieselguhr, alumina, silica gel, bentonites, etc., which increase the active surface of the metal oxides. Finely divided metal catalysts, such as nickel, may also be added to promote the reformation of hydrocarbons with $CO_2$ formed in the process, into CO and $H_2$.

The solids used in the first stage of the process may have a particle size within the range of 50–400 mesh with at least 75% having a particle size larger than 325 mesh. At these particle sizes, superficial linear gas velocities of about 0.3–3 ft. per second, preferably 1–2 ft. per second, are suitable for proper fluidization.

Having set forth the general nature and objects, the invention will be best understood from the more detailed description hereinafter in which reference will be made to the accompanying drawing which is a semi-diagrammatic view of apparatus suitable to practice a preferred embodiment of the invention.

Referring now in detail to the drawing, the system illustrated therein essentially comprises a hydrocarbon oxidizer 10, a metal oxide regenerator 30 and a clean-up oxidizer 50 whose functions and cooperation will be explained forthwith using the conversion of natural gas with titanium dioxide (promoted by a composite containing about 80% $Fe_2O_3$, 10% NiO and 10% $Cr_2O_3$) in the first stage and oxygen of 95% purity in the second as an example. It should be understood, however, that other hydrocarbon gases and other metal oxides may be used in a substantially analogous manner.

In operation, hydrocarbon oxidizer 10 contains a dense bed 12 of titanium dioxide having a particle size of about 200–300 mesh fluidized to form an upper level $L_{10}$ at about 5–15 ft. elevation, by the gaseous reactants and reaction products flowing upwardly at a superficial linear velocity of about 1.5 ft. per second at the top of the bed. Natural gas, preferably preheated to a temperature of about 800°–1000° F., is supplied through line 14 and steam superheated to a similar temperature may be added through line 16 for fluidization and conversion purposes. Proper distribution of the gas feed is accomplished by conventional distributing means such as a perforated grid 18.

Metal oxide regenerator 30 is arranged in an elevated position with respect to oxidizer 10 and contains a dense bed 32 of reduced metal oxide in the state of reoxidation and fluidized to assume a level $L_{30}$, by air, preferably preheated to about 800°–1000° F., and supplied through line 34 and grid 38 at a superficial linear velocity within regenerator 30 of about 1–2 ft. per second and in amounts sufficient to reoxidize metal and lower metal oxides to the higher oxidation stage desired for oxidizer 10. About 2–3 volumes of air per volume of natural gas charged is usually adequate for this purpose. Oxidizer 10 may be maintained at an elevated pressure of, say, about 75–200 lbs. per square inch, preferably 100–150 lbs. per square inch, while regenerator 30 is kept at a lower pressure, preferably at about atmospheric to 50 lbs. per square inch.

Reoxidized titanium dioxide is withdrawn from a lower portion of bed 32 into a standpipe 36 aerated through taps $t$ and flows under the pseudo-hydrostatic pressure of dense phase 32 and standpipe 36 provided with a bottom control valve 39, substantially at the temperature of bed 32, into oxidizer 10, is reduced therein by the natural gas and returned through the reverse standpipe 40 provided with a top control valve 44 under the pressure of oxidizer 10 to regenerator 30. Control valve 44 may also be placed lower in reverse standpipe 40, in which case aeration gas is supplied to standpipe 40 through one or more taps t above such lower valve, particularly during the starting period.

The heat required for the oxidation of natural gas in oxidizer 10 is supplied as sensible heat of reoxidized metal oxide supplied from regenerator 30 through standpipe 36. To accomplish this, regenerator 30 is operated at a temperature higher than that of oxidizer 10, say higher by about 50°–200° F. or more. Operating temperatures for titanium dioxide may be about 1500°–1900° F., preferably about 1600° F. in regenerator 30 and about 1400°–1600° F., preferably about 1500° F. in oxidizer 10. At these conditions, a solids circulation rate of about 8 to 12 lbs. per cubic ft. of natural gas to be converted is generally sufficient to maintain the desired heat balance.

Residual air containing about 95–100% nitrogen is withdrawn from level $L_{30}$ through a gas solids separator, such as cyclone 33 provided with solids return pipe 37, and then through line 43, to be used for any desired purpose, preferably after heat exchange with process gases and/or solids. If desired, fresh metal or metal oxide may be supplied to reoxidizer 30 through line 35 and metal oxide fines of undesirably small size may be discarded through line 46.

Returning now to oxidizer 10, a partially converted product gas which may still contain up to about 10% or more of unconverted methane is withdrawn from level $L_{10}$ and passed substantially at the temperature and pressure of oxidizer 10 through line 48 to clean-up oxidizer 50. Oxygen of about 95% purity, preferably preheated to about 700°–900° F., is supplied through line 52 to clean-up oxidizer 50 in amounts sufficient to convert the remainder of the natural gas to CO and $H_2$ and to maintain a temperature of about 2100°–2300° F. within oxidizer 50. About 2–4 volumes of oxygen per 100 volumes of gas supplied through line 48 is usually sufficient for this purpose. Any metal or metal oxide fines carried from oxidizer 10 to oxidizer 50 by the gas passing through line 48 are sintered and agglomerated in oxidizer 50 so that the large particles formed will drop out of the gas and collect in the bottom of oxidizer 50 from which they may be removed continuously or periodically through line 53, to be returned through line 35 to regenerator 30, preferably after grinding to the desired particle size.

Product gas consisting predominantly of CO and $H_2$ and containing mere traces of unconverted hydrocarbon and relatively small amounts of $CO_2$ and $H_2O$ is withdrawn from oxidizer 50 through line 54. Its heat content may be used to preheat process gases and/or solids in any conventional manner. It may be used directly for the catalytic synthesis of hydrocarbons, if desired, after purification. The product gas may also be reacted wholly or in part with steam to convert CO to $CO_2$ which may be removed to produce pure hydrogen.

The embodiment of the invention illustrated by the drawing permits of various modifications. Purging stages may be provided in lines 36 and 40 using inert gases such as steam, residual air, etc. in a manner known per se., to prevent the formation of explosive mixtures. A gas solids separator similar to separator 33 may be arranged between oxidizer 10 and line 48. The gas leaving regenerator 30 may be cooled prior to its entry into separator 33 to prevent damage thereto by overheating. Separator 33 may then be arranged outside regenerator 30. Instead of using standpipes 36 and 40 for circulating solids between oxidizer 10 and regenerator 30, other conventional means for conveying fluidized solids may be used, such as mechanical conveyors, lock hoppers, etc.

The invention will be further illustrated by the following specific example.

Example

For the production of the synthesis feed gas required by a hydrocarbon synthesis plant designed for an output of about 10,000 barrels of liquid fuels per day, the process of the invention may be operated at the approximate conditions listed below:

| | |
|---|---:|
| Natural gas feed rate (90% $CH_4$), mols/hr. | 12,940 |
| Natural gas preheating temperature, °F | 900 |
| Steam feed rate to oxidizer 10, mols/hr. | 6,260 |
| Steam preheating temperature, °F | 900 |
| Air feed rate to regenerator 30, mols/hr. | 30,900 |
| Air preheating temperature, °F | 900 |
| 95% oxygen feed rate to oxidizer 50, mols/hr. | 1,200 |
| Preheating temperature of oxygen, °F | 800 |
| Temperature in oxidizer 10, °F | 1,500 |
| Pressure in oxidizer 10, lbs/sq. in. gauge | 100 |
| Temperature in regenerator 30, °F | 1,600 |
| Pressure in regenerator 30, lbs/sq. in. gauge | 10 |
| Temperature in oxidizer 50, °F | 2,200 |
| Pressure in oxidizer 50, lbs./sq. in. gauge | 95 |
| Solids circulation rate, based on $TiO_2$ between oxidizer 10 and regenerator 30, tons/min. | 420 |
| Nitrogen production in regenerator 10, mols/hr. | 24,400 |
| Total gas production in oxidizer 10, mols/hr. | 39,900 |
| Production of CO+$H_2$ in oxidizer 10, mols/hr. | 27,700 |
| Composition of gas produced in oxidizer 10: | |
| CO _____percent | 19.6 |
| $H_2$ _____do | 49.9 |
| $CO_2$ _____do | 6.4 |
| $N_2$ _____do | 2.0 |
| $H_2O$ _____do | 15.9 |
| $CH_4$ _____do | 5.8 |
| Impurities _____do | 0.4 |
| | 100.0 |
| Total gas production in oxidizer 50, mols/hr. | 44,500 |
| Production of CO+$H_2$ in oxidizer 50, mols/hr. | 34,500 |
| Composition of final product gas (after desulfurization): | |
| CO _____percent | 25.2 |
| $H_2$ _____do | 52.2 |
| $CO_2$ _____do | 3.1 |
| $N_2$ _____do | 2.3 |
| $H_2O$ _____do | 17.0 |
| $CH_4$ _____do | .2 |
| | 100.0 |

While the foregoing description and exemplary operations have served to illustrate specific applications and results of my invention, other modifications obvious to those skilled in the art are within the scope of my invention. Only such limitations should be imposed on the invention as are indicated in the appended claims.

I claim:

1. An improved process for manufacturing a gaseous fuel containing predominantly $H_2$ and CO, which comprises continuously forcing a hydrocarbon gas predominantly methane into a conversion zone containing a fluidized mass of a finely-divided metal oxide adapted to convert said hydrocarbon gas to hydrogen and CO, maintaining a temperature within said conversion zone within the range of from about 1400° to 1600° F., permitting contact between said gaseous hydrocarbon and said fluidized metal oxide for a sufficient period of time to permit at least partial conversion of said hydrocarbon gas into $H_2$ and CO, withdrawing a produce containing said $H_2$ and CO and hydrocarbon unreacted gas, and also entrained metal-containing fines, from said conversion zone, charging said gas to a second zone, contacting said gas with substantially pure oxygen in said second zone sufficient in amount substantially completely to convert said unreacted hydrocarbon gas into $H_2$ and CO, and to sinter and agglomerate metal-containing particles, by maintaining in said last named zone a temperature within the range of from about 2000° to 2500° F., and withdrawing from said second zone a product gas substantially free of hydrocarbons and also recovering from said second zone the sintered and agglomerated metal-containing fines.

2. An improved process for manufacturing a gaseous fuel containing predominantly $H_2$ and CO, which comprises continuously forcing a hydrocarbon gas into a conversion zone containing a fluidized mass of a finely-divided metal oxide adapted to convert said hydrocarbon gas to hydrogen and CO, maintaining a temperature within said conversion zone within the range of from about 1400° to 1600° F., permitting contact between said gaseous hydrocarbon and said fluidized metal oxide for a sufficient period of time to permit at least partial conversion of said hydrocarbon gas into $H_2$ and CO, withdrawing a product containing said $H_2$ and CO and hydrocarbon unreacted gas, and also entrained metal-containing fines, from said conversion zone, charging said gas to a second zone, contacting said gas with substantially pure oxygen in said second zone sufficient in amount substantially completely to convert said unreacted hydrocarbon gas into $H_2$ and CO, and to sinter and agglomerate metal-containing particles, by maintaining in said last named zone a temperature within the range of from about 2000° to 2500° F., and withdrawing from said second zone a product gas substantially free of hydrocarbons, and also recovering from said second zone the sintered and agglomerated metal-containing fines.

3. The process of claim 2 in which reduced metal oxide is withdrawn from said conversion zone, regenerated with air in the form of a dense, turbulent, fluidized mass of solids in a regeneration zone at an oxidizing temperature and returned to said conversion zone substantially at the temperature of said regeneration zone.

WARREN K. LEWIS, Jr.

REFERENCES CITED

The following references are of record in the file of this patent:

UNITED STATES PATENTS

| Number | Name | Date |
|---|---|---|
| 1,899,184 | De Simo | Feb. 28, 1933 |
| 1,921,856 | Wietzel et al. | Aug. 8, 1933 |
| 2,042,285 | Wilke et al. | May 26, 1936 |
| 2,362,296 | Murphree et al. | Nov. 7, 1944 |
| 2,425,754 | Murphree et al. | Aug. 19, 1947 |
| 2,490,986 | Symonds | Dec. 13, 1949 |